July 6, 1965  C. M. LAMB  3,193,260
APPARATUS FOR AERATING AND ELIMINATING ICE ON WATER
Filed March 13, 1961  3 Sheets-Sheet 1

INVENTOR.
CHARLES M. LAMB
BY
ATTORNEY

July 6, 1965 C. M. LAMB 3,193,260
APPARATUS FOR AERATING AND ELIMINATING ICE ON WATER
Filed March 13, 1961 3 Sheets-Sheet 2
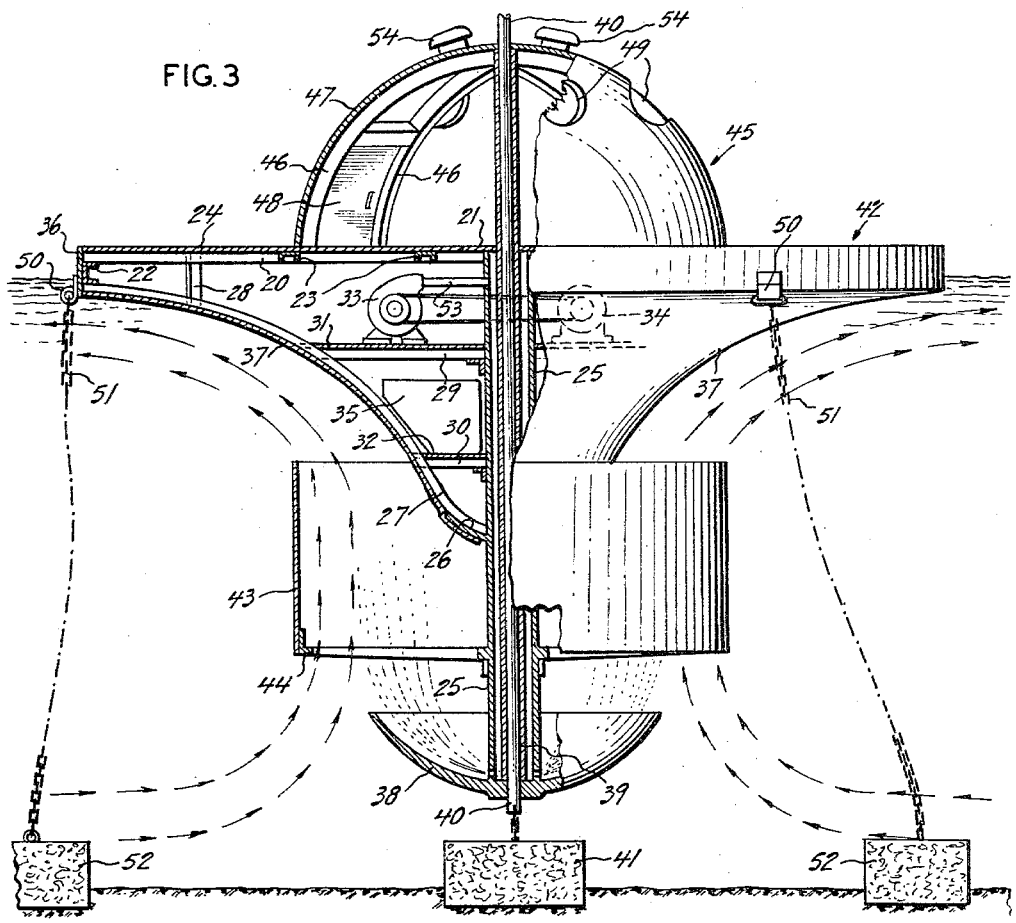
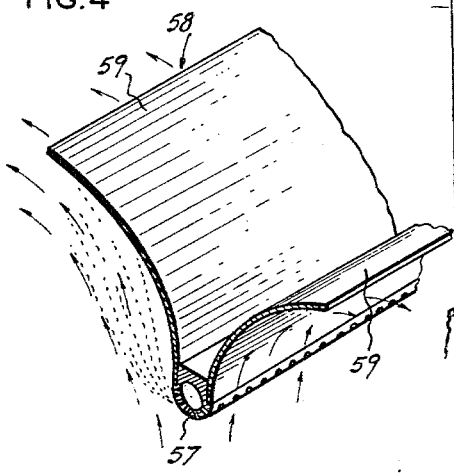
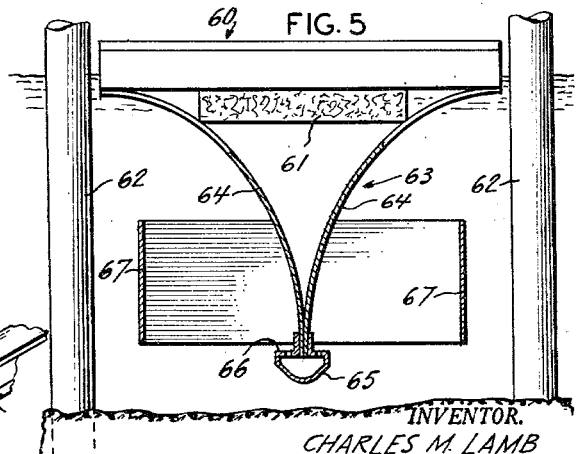
INVENTOR.
CHARLES M. LAMB
BY
ATTORNEY July 6, 1965 C. M. LAMB 3,193,260
APPARATUS FOR AERATING AND ELIMINATING ICE ON WATER
Filed March 13, 1961 3 Sheets-Sheet 3

INVENTOR.
CHARLES M. LAMB
BY
ATTORNEY

United States Patent Office 3,193,260
Patented July 6, 1965

3,193,260
APPARATUS FOR AERATING AND ELIMINATING ICE ON WATER
Charles M. Lamb, 511 Glenbrook Rd., Glenbrook, Conn.
Filed Mar. 13, 1961, Ser. No. 95,114
6 Claims. (Cl. 261—64)

This invention relates to an apparatus for causing ice to melt in freezing weather and aerating the water in marinas and bodies of water of various sizes.

According to the invention, an apparatus is provided for deicing and aerating water, by forcing air bubbles out of a manifold below the surface of the water and adjacent the lower wall of the casing member of the apparatus. The casing member of the apparatus has a lower wall which extends upwardly from a downwardly pointed lower end portion and flares outwardly in curved relation toward an outer upper edge. The air bubbles from the manifold flow upwardly along the flaring lower wall of the casing member and are caused by the upwardly and outwardly flaring shape of the lower wall toward the top portion of the casing member to flow outwardly as the bubbles rise toward the surface of the water. This upward and outward flow of the air bubbles guided by the casing member causes an upward and outward flow of water with the bubbles for circulating the air and water from a distance below the surface upwardly and outwardly from the casing member near the surface of the water. This water flow brings warm water from below the surface upwardly to the surface for melting ice which has formed on the water surface and for maintaining the surface ice free for a considerable distance away from the apparatus.

The invention is used in marinas for keeping the water near boats moored in the marina free of ice during winter months and also for keeping the water clean and fresh through the air which combines and circulates with the water. The invention has many other uses where it is desired to keep either salt or fresh water free of ice in winter and for aerating the water. Other uses of the invention may include use in ponds, lakes and parts of other bodies of water for the benefit of water birds, fish and various types of commercial installations where it is desired to eliminate ice formation in winter and aerate the water at various seasons of the year.

The invention provides an apparatus having a casing member constructed to float on or near the surface of the water with a lower wall structure formed with a lower end portion terminating a distance below the water surface and the top of the casing member. The lower wall has a side portion which flares outwardly to form an upwardly and outwardly curved lower wall. The casing member is preferably hollow and is provided with a deck at the top which may be provided with a super structure where casing members of larger size are employed. An upwardly extending guide member extends through the casing member from the top to the lower end portion of the lower wall for slidably receiving an anchor and guide post for use where the apparatus is moored independently and at a distance from other objects in the water, such as docks, piles and boats. Where the apparatus is used for deicing water about a dock, the casing member may be directly mounted under the dock floor or deck and secured to the dock.

The invention provides for mounting the air manifold at the lower end of the casing member of the apparatus or near or on the bottom of the body of water. The air manifold may be mounted on the anchor and guide post for the casing member at the lower end while the air supply pipe connections may be run along the bottom of the body of water from an air compressor mounted on the shore.

The air providing the bubbles for the apparatus is delivered by a motor driven air compressor or any other conventional means for supplying air under pressure sufficient to cause the air to flow out of the air manifold against the pressure of the water. This is usually a rather low pressure because the apparatus will be usually used in shallow waters along the shore where small pleasure boats are moored. However, the apparatus may be used in deeper water where the air manifold may be mounted on the lower end of the casing member or the anchor post or guide member and positioned at a distance below the surface from which the most efficient results may be obtained. The air manifold is constructed to produce small bubbles which are found to obtain better results.

Larger size apparatus employing the invention will have the casing member formed to provide a float where the apparatus is used independently. The casing member will be equipped with one or more compartments for housing an air compressor, a motor or other power source for operating the compressor and a fuel storage tank for motors operated by fuel, such as an internal combustion engine. The casing member will be provided with a top portion which may include a deck, access doors, port holes, waterproof air intake, ventilators and other equipment that will facilitate manual access to the compartment for inspection, installation and servicing of the compressor, motor and other equipment forming part of the assembled apparatus.

The invention also provides for the use of a flow control baffle or band spaced outwardly from the lower wall of the casing member and extending below the lower end portion of the lower wall from a position outwardly beyond and above the air manifold for controlling the air bubble flow in its upward movement along the bottom wall of the casing member to secure increased flow of water with the bubbles.

The invention provides means for closing apertures in the air manifold in order to prevent the entrance of dirt and foreign matter during periods when air is not being discharged.

The apparatus provided by this invention may be made in many different sizes from very small sizes for aerating the water and eliminating ice on its surface in bodies of water like swimming pools and small ponds to larger bodies of water where larger sizes of the device may be made for eliminating the formation of ice on the surface of the water over larger areas. When substantially large bodies of water are to have ice formation removed, the invention may be made in large sizes in which the air compressor and the source of power for operating it to deliver air to the manifold for operation of the apparatus will be self contained. Accessory equipment may also be self contained in larger units so that the apparatus may be equipped with navigation signals and constructed to provide manual access to the interior of the apparatus by means of suitable access doors. Provision may be made to have larger units manned during operation with personnel stationed on the apparatus and provided with necessary equipment to live on board for such periods as may be required.

In the drawings:

FIG. 3 is a side elevation of an apparatus similar to that shown in FIG. 1, illustrating modifications and additional features of construction that will be incorporated in large sized units having self-contained equipment for generating the compressed air and housing such accessories as may be required in connection with operation of the apparatus with personnel stationed aboard.

FIG. 4 shows a casing member in perspective, illustrating a modified form of apparatus where the lower wall of the casing member is formed of two curved sections extending upwardly and flaring outwardly from a lower end portion formed to provide an air manifold.

FIG. 5 shows the invention applied to a floating dock unit in which the casing member forming the apparatus is secured to the lower side portions of the dock unit to extend below the bottom of the dock. The wall portions of curved form as shown in FIG. 5, extend lengthwise of the dock unit.

Figure 1:
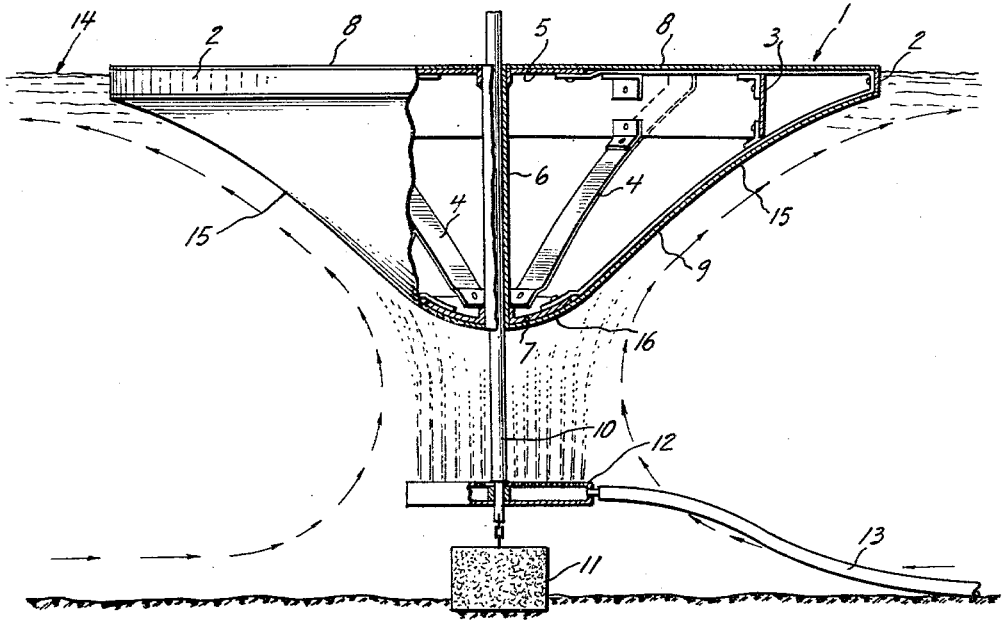
FIG. 1 shows a side elevation of the apparatus with portions broken away and shown in cross section for illustrating details of construction of an apparatus embodying the invention particularly adapted for use in constructing small to medium sized units.
Figure 2:
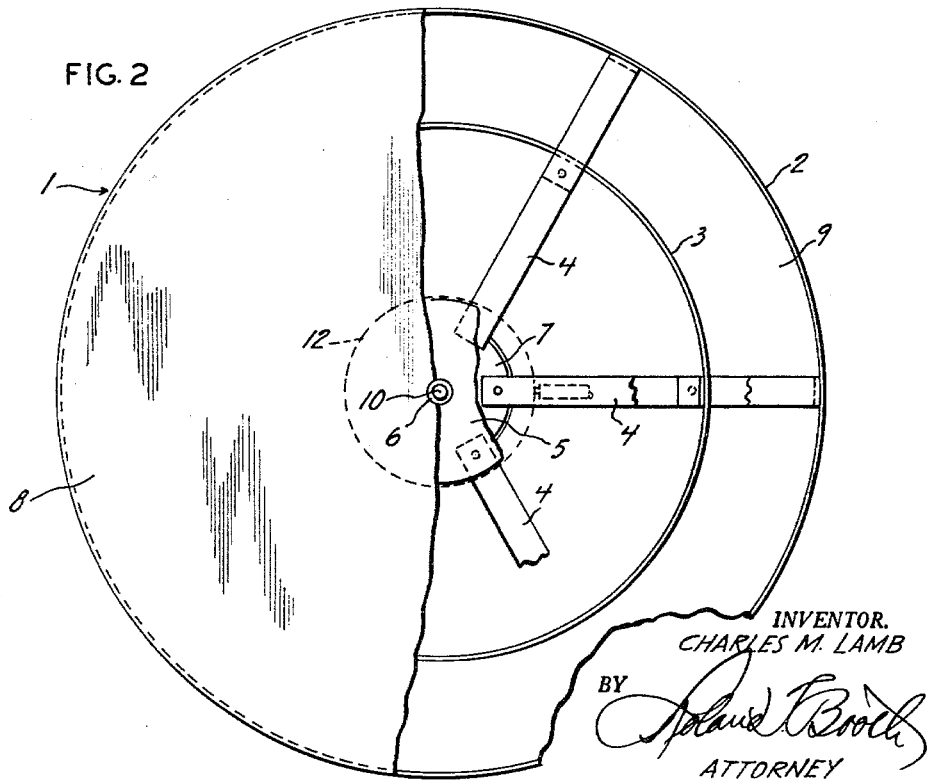
FIG. 2 is a plan view of the apparatus shown in FIG. 1 illustrating the apparatus as being constructed in circular form and having portions broken away to show details of the inner framework.

A casing member 1, is shown in FIGS. 1 and 2, having an outer cylindrical edge member 2, secured to a frame. The frame has an inner cylindrical supporting wall 3. A plurality of radially extending ribs 4 are secured to outer edge member 2 and inner cylindrical supporting wall 3. The upper inner ends of ribs 4 are secured to a central mounting plate 5 rigidly mounted on the end of tube or post member 6 which extends in vertical relation through the casing member. Radial ribs 4 extend outwardly from upper central mounting plate 5 in forming top frame members in substantially horizontal relation and are then turned downwardly. The down turned portions of ribs 4 are suitably secured by rivets, welding or the like to the inner face of outer cylindrical edge member 2, as shown in FIGS. 1 and 2. The lower ends of these ribs then extend inwardly from outer edge member 2 and curve downwardly to the lower end of the casing member where they are secured to lower mounting plate 7. Lower mounting plate 7 is rigidly secured to the lower end of tube or post member 6.

Intermediate portions of the upper and lower ends of radially extending ribs 4 are secured by brackets or the like to the upper and lower edges of inner cylindrical supporting wall 3, as clearly shown in FIGS. 1 and 2. This provides a rigid supporting frame structure for mounting top wall 8 and lower wall 9. Top wall 8 is of flat circular shape as illustrated in FIGS. 1 and 2 and is mounted on the outer upper faces of ribs 4 and upper central mounting plate 5 with the outer margin secured to the edges of outer cylindrical edge member 2 in liquid-tight relation. Lower wall 9 has a substantial V-shape in cross-section, as shown in FIG. 1, and has the upper inner surface supported by the lower inwardly extending ends of radially extending ribs 4. Lower wall 9 has the lower end portion 16 extending over and secured to lower mounting plate 7 where an aperture is formed for receiving the lower end of tube 6 while the outer marginal portion of lower wall 9 is suitably secured in liquid tight relation with the lower margin of outer cylindrical edge member 2.

This provides a casing construction having tube 6 opening through top wall 8 and bottom wall 9 for slidably receiving a guide member 10 in the form of an elongated rod or tube having the lower end secured to an anchor 11 by a flexible connection, such as a cable or chain. An air manifold 12 is rigidly mounted on the lower end of guide member 10 and has a hose connection 13 with a suitable air compresser located at a distance from the casing member. Air manifold 12 is illustrated in FIGS. 1 and 2 as being of circular construction and having upper and lower walls mounted in spaced parallel relation with the upper wall formed with a plurality of apertures to allow air forced into the interior of the manifold by a compressor (not shown) through hose connection 13 to escape through the apertures and travel upwardly toward the lower end portion of lower wall 9. The apparatus shown in FIGS. 1 and 2 as above described, may be of any suitable size from approximately three feet in diameter to as much as ten to twenty feet in diameter. The apparatus illustrated will be located in a body of water of relatively small size such as a small lake or harbor. This apparatus is designed for use in small boat marinas where the harbor for the marina may be of a size to accommodate from a few to more than 100 small pleasure boats and where the water depths may range from six to fifteen or more feet. The casing member will float with top wall 8 and a portion of outer cylindrical edge member 2 projecting above the water surface indicated by the numeral 14 in FIG. 1. Bottom wall 9 will project below the water surface while anchor 11 will be located on the bottom and be of sufficient weight to hold the casing member in position at a desired location in a body of water for its most effective use. Air hose connection 13 will normally lie and be retained in position on the bottom and extend to the shore where a suitable air compressor operated by an electric motor or internal combustion engine may be located in a suitable building on an adjacent land area. Casing member 1 will float on the water as indicated, while guide member 10 will permit its slidable movement up and down through tube 6 sliding thereon so that the casing member will always float in the same position relative to the water surface. This type of construction is used in small bodies of water or harbors where the tides cause the water level to rise and fall at different times of the day. In this way casing member 1 will rise and fall with the tide without disturbing the position of the anchor and guide member 10. Guide member 10 will hold casing member 1 in horizontal position in the water, as illustrated in FIG. 1, in the location where it is desired to have it operate.

When compressed air is forced through hose 13 to manifold 12, it will be discharged through the apertures in the upper wall of the manifold and flow upwardly toward the lower end portion in the central portion of casing 1, where it will then begin to flow in all directions outwardly along side portions 15 upwardly from lower end portion 16 and outwardly toward outer cylindrical edge member 2 as illustrated by the dotted lines and arrows in FIG. 1. The upwardly and outwardly curved and flared form of lower wall 9 causes the air bubbles to flow outwardly as they flow upwardly so that when they reach the upper outer edge portion of casing 1, they will be directed outwardly away from the casing member. This flow of the air bubbles from manifold 12 causes the water from the bottom of the body of water in which the apparatus is anchored to flow upwardly with the air bubbles against lower wall 9 and then be directed upwardly and outwardly in all directions from outer cylindrical edge member 2. The air bubbles will effectively aerate the water and provide oxidation for many types of contamination which may be found in the water. The air bubbles also cause water circulation to bring warm water up from below the surface of the body of water in which the apparatus is located and discharge it outwardly from casing member 1 in all directions. In freezing weather in the wintertime this flow of warm water with the air bubbles will cause any ice formations on the surface to be melted and disappear. It has been found that substantial areas of water can be maintained free of ice formation on the surface continuously throughout the coldest weather. This provides an apparatus for use in marinas where small boats may be tied up to docks all winter long without becoming frozen in and in this way eliminate substantial expense in pulling small boats out of the water during the wintertime and at the same time maintain the hulls in proper condition. Ice formation in tidal waters freezes to piles and in many instances pulls the piles out of the bottom causing substantial damage to piers and other installations. The present invention by eliminating ice formation eliminates this type of damage to piers, etc.

The apparatus illustrated in FIG. 3 is similar to that shown in FIGS. 1 and 2, but illustrates modifications in the construction of the casing member to show how the apparatus may be constructed in larger sizes which may have a diameter of fifty to one hundred feet or more. The frame of the apparatus shown in FIG. 3 will have a plurality of horizontal floor beams 20 which may extend in radial relation in a circular shaped apparatus with the inner ends secured to a center mounting plate 21 and the outer ends secured to an annular channel frame 22. Intermediate the ends of floor beams 20 suitable cross beams 23 may be secured to provide a frame work for supporting an upper deck 24. The construction shown in FIG. 3 illustrates a central supporting tube or post member 25. This tube 25 forms part of the supporting frame structure for the casing member. Spaced substantially below center mounting plate 21 at the lower end of tube 25 is a lower frame plate 26. A plurality of radially extending ribs 27 are secured to the marginal portion of lower frame plate 26 at their lower ends and extend upwardly and flare outwardly in curved relation in the manner illustrated in FIG. 3. The upper outer ends of ribs 27 are secured to the lower flange portion of annular channel frame 22. The shape of these radially extending ribs 27 provides the upwardly and outwardly curved construction to determine the shape of the lower wall of the casing member which causes the air bubbles and water to flow upwardly and outwardly from the apparatus. Floor beams 20 and radially extending ribs 27 may have suitable vertically extending connecting bars 28 secured to the aligned beams 20 and ribs 27 as shown in FIG. 3 in inwardly spaced relation from annular channel frame 22 to increase the strength of the frame structure.

The construction illustrated in FIG. 3 is designed for the purpose of having self-contained aerating and deicing apparatus and for this purpose will have a considerable amount of space within the frame structure receiving the self-contained equipment. For this purpose additional floor beams 29 and 30 may be mounted in horizontal relation and extend between central supporting tube 25 and radially extending ribs 27 at desired distances below upper deck 24. These floor beams 29 and 30 support decks 31 and 32. Suitable access, such as ladders or stairways, not shown, may be provided in the framework and decks to provide for manual access from upper deck 24 to both of the lower decks 31 and 32. In an apparatus of this character, the decks 31 and 32 may be used for supporting the air compressor illustrated diagrammatically at 33 and the internal combustion engine or motor for driving the air compressor illustrated diagrammatically at 34. In the case of an internal combustion engine, the fuel tanks may be mounted on deck 32, as indicated diagrammatically at 35. It will be understood that where it may be desired to have the fuel tanks above the motor 34 and the compressor 33 that this arrangement may be reversed from that shown in FIG. 3 depending upon the type of engine and compressor that is used and the type of fuel to be used together with the manner of feeding the fuel to the engine.

The framework hereinabove described in FIG. 3 will have the outer side edge portion covered by an outer cylindrical wall member 36 secured to annular channel frame 22 and the ends of floor beams 20 and radially extending ribs 27. The upper edge or marginal portion of outer cylindrical wall member 36 will have a fluid-tight connection made with the outer margin of upper deck 24. Ribs 27 support lower wall 37 of the casing member which will be formed in curved relation to fit the shape of ribs 27 with the lower marginal portion secured to lower frame plate 26 in fluid-tight relation and the upper outer edge portion secured to outer cylindrical wall member 36 in fluid-tight relation. Lower wall 37 will extend upwardly and flare outwardly in curved relation from lower frame plate 26 arranged in the lower central portion of the casing member, as illustrated in FIG. 3, to the upper outer edge at the bottom edge of outer cylindrical wall member 36. Supporting tube 25, as shown in FIG. 3, extends downwardly below lower frame plate 26 and supports an air deflecting member 38 of partially spherical shape on the lower end. A guide tube 39 is mounted in concentric relation inside central supporting tube 25 to provide a space between the outer surface of tube 39 and the inner surface of supporting tube 25. The upper and lower ends of these tubes 25 and 39 are secured together in order to provide a closed air passage about guide tube 39 while the central portion of guide tube 39 opens through the top and bottom of the apparatus for slidably receiving a guide member 40. Guide member 40 has the lower end attached by a suitable chain or the like to an anchor 41. Anchor 41 is used to retain the casing member 42 formed by the frame and the walls hereinabove described as shown in FIG. 3 at a desired location in a body of water where it is desired to maintain the surface ice free during freezing weather and also aerate the water. This manner of retaining the apparatus in a desired location in a body of water is identical to that shown in FIG. 1 in which guide member 40 slidably engages in guide tube 39 so that casing member 42 can move upwardly and downwardly relative to guide member 40 and anchor 41 with variations in the water level due to rise and fall of tidal waters or rise and fall due to other causes.

The lower end portion of central supporting tube 25 is formed with a plurality of apertures to permit air under pressure within the tube to be forced outwardly against the lower inner face of air deflecting member 38. The air bubbles will be forced outwardly in a substantially horizontal direction by the pressure of the air as it moves through the apertures in the lower end of supporting tube 25. These bubbles will then travel outwardly and engage portions of the inner surface of air deflecting member 38 which will cause the bubbles to then move upwardly throughout a substantial portion of the water adjacent to supporting tube 25.

A baffle member or plate 43 is mounted in outwardly spaced relation at a suitable distance beyond supporting tube 25 so as to extend from a point slightly above the outer edge of air deflecting member 38 in vertical relation toward the lower wall 37 of the casing member. This baffle member has the upper edge terminating in spaced relation outwardly from and below lower wall 37 and casing member 42 and provides a means of concentrating the flow of air bubbles upwardly from air deflecting member 38 toward lower wall 37 for assisting the air in circulating water upwardly with it against lower wall 37. Baffle member 43 is supported by a frame 44 having a plurality of radial arms extending outwardly from central supporting tube 25 and attached at the lower inner edge to the baffle member.

The arrows in FIG. 3 and the dotted lines show the water and air circulation when the apparatus is in use in which the air bubbles flow upwardly in the water against the lower end portion of lower wall 37. This upward flow of air bubbles and water then moves upwardly and outwardly along lower wall 37 of casing member 42 so that the water will move outwardly beyond outer wall member 36 away from casing member 42 in all directions. This creates a circulation of warm water from the bottom or from lower portions of the body of water in which the casing member 42 is located to the surface so that the warm water will melt ice formation on the surface and maintain the surface of the water ice free for a substantial distance beyond the outer edge of casing member 42 in addition to providing aeration of the water.

Casing member 42 in larger sizes of apparatus of the type shown in FIG. 3 with the deck structure hereinabove described will have a superstructure mounted thereon generally indicated by the numeral 45. This superstructure may be of any suitable shape and is here shown in FIG. 3 as of dome shape and having frame members 46 secured at their lower ends to floor beams 20 and deck 24 and the upper ends secured to the upper end of tube 25.

An outer wall 47 has a lower edge portion secured in fluid-tight relation to deck 24 and the upper central portion secured in fluid-tight relation to the upper end of the guide tube so that guide member 40 may slide through the tube and extend outwardly above superstructure 45. The superstructure is preferably provided with a door 48 of conventional form which is preferably mounted so that it will have the lower end adjacent to deck 24. The door will be mounted in the superstructure in water-tight relation in a manner well known in the art and will provide means for access to the interior of casing member 42. The superstructure may also have outer wall 47 provided with port holes 49 closed by conventional type of porthole structures carrying glass inserts so as to admit light to the interior of the superstructure and casing member 42. The superstructure may provide sufficient space in larger units for the accommodation of personnel where it is desired to have the apparatus manned during its use. For this purpose additional equipment such as electrical generators with the necessary wiring and facilities for lighting the inside and such other facilities as may be desired are mounted within casing member 42 and superstructure 45. Suitable navigation signals of a conventional type, not shown, may also be provided on the apparatus as disclosed in FIG. 3.

In large units as illustrated in FIG. 3 additional anchoring for the apparatus at a desired location in a body of water may be required in addition to guide tube 40 and anchor 41. This additional anchoring means consists in having suitable brackets 50 mounted at spaced intervals around outer cylindrical wall member 36 for the attachment of an anchor chain or cable to each of the brackets as indicated at 51, which may have the opposite ends attached to anchors 52. Anchors 52 are spaced outwardly in several different directions from the outer periphery of casing member 42 and by means of the anchor chains or cables 51, casing member 42 will be retained in the desired location in cooperation with anchor 41. Under some circumstances, inner guide tube 39, guide member 40 and anchor member 41 may be eliminated in constructing the casing member which may involve a reduction in the cost of construction and assembly of the apparatus. The interior of casing member 42 may have air vents 54 of conventional form or other suitable means for ventilating and circulating air therein.

When the apparatus shown in FIG. 3 is constructed as above described the air compressor 33 will be connected by a suitable pipe 53 to supporting tube 25. The air from the compressor will travel through tube 25 to the lower end thereof where it is ejected through the apertures as above described. Motor 34 may operate compressor 33 by any suitable means such as a belt, gearing, or other means well known in the art. Motor 34 and air compressor 33 may be built in one unit with a single drive shaft, in a conventional manner well known in the art.

FIG. 4 shows a construction having a casing member of rectangular shape rather than circular shape. A modified form of air manifold is also disclosed. With a rectangular construction of casing member it may be desirable to have the construction designed for air bubble flow in two directions opposite to one another from each side of the longitudinal dimension of the casing member. Rectangular constructions are desirable for certain types of water aeration and ice removal, such as where docks are used. In marina construction it is customary to use float constructions having a deck supported above the water surface by float members of any suitable conventional form. These floats are usually made in sections and attached together in aligned relation extending from the shore outwardly into a body of water where it is desired to tie up a number of boats on opposite sides of the dock. Where it is desired to have a water aerating and ice eliminating device of the type disclosed in this application used with a dock construction, it will be understood that the floating dock, particularly where used in tide water, will usually be retained in position by piles located on opposite sides of the dock in a manner illustrated in FIG. 5. The casing member may be constructed either as shown in FIG. 4 or FIG. 5 for use in connection with a floating dock construction and the specific details of the construction of the casing member as shown in FIGS. 4 and 5 and will now be described.

The casing member as shown in FIG. 4 includes an air manifold 57 which forms the lower end portion of the lower wall of the casing member 58. Side portions 59 have the lower edges secured to opposite sides of air manifold 57 along the upper side margins thereof in rigid relation. The lower portion of air manifold 57 is rounded and formed with a plurality of apertures for the passage of air under pressure from the air manifold outwardly therefrom. Side portions 59 of the casing member extend upwardly and outwardly in curved relation to form a substantially V-shaped construction in which the upper ends curve or flare outwardly away from each other. Air bubbles leaving the air manifold at the lower end portion of casing member 58 travel upwardly and are guided outwardly by side portions 59 in the same manner as hereinabove described for the purpose of causing upward water flow from below the surface up to the surface and outwardly along the surface from opposite sides of side portions 59 of casing member 58. Casing member 58 may have a longitudinal dimension of any desired length, FIG. 4 showing only a fragmentary portion of the construction. The top portion of the casing member is omitted from FIG. 4 and is found to be unnecessary when the casing member constructed as shown in FIG. 4 is used in conjunction with a floating dock as illustrated in FIG. 5. Where a construction as shown in FIG. 4 is to be used below a floating dock such as shown in FIG. 5, the outer upper marginal portions along the longitudinal dimension of side portions 59 are secured to the bottom side edges of a floating dock unit. Usually the length of a rectangular casing member 58 as shown in FIG. 4 will be such as to not exceed the length of the dock unit.

FIG. 5 shows an end view of a dock unit 60 which is floated on the surface of a body of water by a suitable float 61 of conventional form. Where dock unit 60 is used in tidal water it is customary to retain it in position between spaced piles as indicated at 62 in a manner well known in the art. It is customary to moor small boats at opposite sides of dock unit 60 or to piles 62 in a convenient manner when they are not being used or when loading and boarding such boats. The present invention provides a means of using the dock units to support water aerating and ice eliminating apparatus using a casing member such as shown at 58 in FIG. 4 or a slightly modified form of casing member, as indicated at 63 in FIG. 5.

The casing member 63 has a pair of side portions 64 provided with straight upper and lower edges and has straight interemediate portions curving upwardly and outwardly between the lower and upper edges of a character, as shown in FIGS. 4 and 5. The upper outer marginal portions of side portions 64 are secured to the outer side edges of dock unit 60, as illustrated in FIG. 5. Side portions 64 extend inwardly and downwardly to form a substantial V-shaped construction in cross section as shown in FIG. 5, and have the lower marginal portions engaged and secured together where an air manifold 65 is secured to the lower marginal portions and extends longitudinally throughout the length of side portion 64. Horizontal portions 66 are formed with a plurality of apertures for discharging air upwardly along the lower bottom portions of side portions 64 for upward and outward movement of the air to cause upward and outward water flow due to the outward flaring of the upper edges of these side portions. The air and water will be discharged at the side edges of the dock unit at the upper margins of side portions 64 of casing member 63 so as to keep the water surface clear of ice during freezing weather and also aerating the water in the area extending outwardly from the sides of the float of the dock unit along the boats moored by the dock and beyond the ends of the boat which extend away from the dock.

Baffle plates 67 are mounted in spaced relation and extend in vertical relation beyond the lower ends of side portions 64 of casing 63, as illustrated in FIG. 5. These plates 67 are formed of straight imperforate construction extending throughout the length of said portions 64 with opposite end portions extended laterally toward casing 63 and having the ends secured to the ends of side portions 64 for supporting baffle plates or members 67 in vertical position. Baffle members 67 cooperate with side portions 64 of casing member 63 to aid in circulating air and water upwardly along the upper and outwardly diverging surfaces of sid portions 64 to aid in creating more effective air and water circulation in the same manner as disclosed in the circular unit construction, as illustrated in FIG. 3.

It will be understood that where it is desired to form casing members 58 or 63 to provide a top wall as well as a bottom wall, this will be understood to be clearly within the scope of the invention as shown since it will be clear to anyone skilled in the art that a top wall may be provided on either of the constructions shown in FIG. 4 or 5 by using a rectangular shaped top wall construction and securing it to the upper outer margins of the side portions shown in FIGS. 4 and 5 in the same manner as in the constructions shown in FIGS. 1 and 3. It will of course be necessary to add vertical side walls at the ends of the upwardly and outwardly flaring side portions in the construction shown in FIGS. 4 and 5 to close the casing member to provide a float construction of the type illustrated in FIG. 1 but in which the shape of the casing member is rectangular instead of circular.

Figure 6:
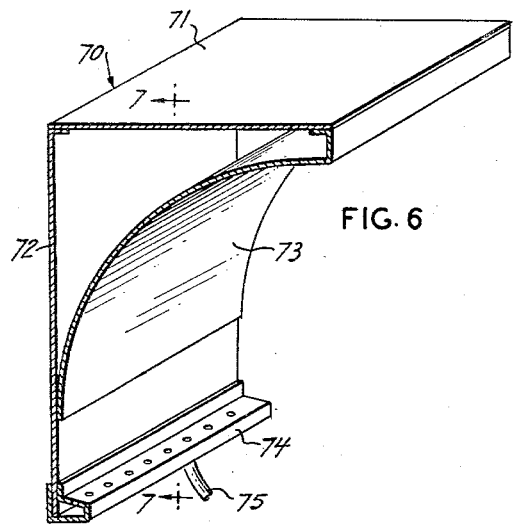
FIG. 6 shows an apparatus formed to provide a wall section extending upwardly and flaring outwardly to one side only so that the operation of the device will work outwardly beyond one side of a rectangular casing construction, as distinguished from operation in opposite directions, as shown in FIG. 5.
Figure 7:
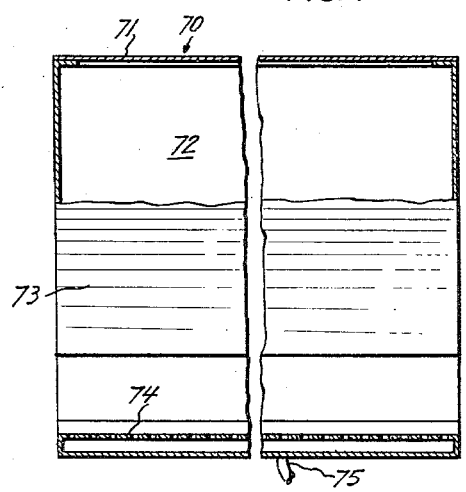
FIG. 7 is a front elevation of the apparatus shown in FIG. 6, with portions broken away and shown in cross section to illustrate details of construction.

It will also be understood that a rectangular casing member may be constructed with the use of only one curved side portion while the opposite side portion may be a vertical side portion. This would in effect produce a unit in which air and water circulation would occur on one side only and in one direction extending outwardly from the casing member. Such a construction is illustrated in FIGS. 6 and 7 which embodies the feature shown in FIGS. 4 and 5 except that the construction is made for circulating air and water in only one direction. For this purpose the casing member 70, as shown in FIGS. 6 and 7, has a top wall 71, and a bottom wall formed of a vertical side portion 72 and an upwardly and outwardly flared side portion 73. An air manifold 74 of substantially rectangular shape in cross section and formed of sheet metal has the edges of the sheet metal forming the manifold tightly secured to the lower end portion of the lower wall of casing member 70. As illustrated in FIGS. 6 and 7 the lower end portion is formed by extending vertical side portion 72 downwardly below the lower end of side portion 73 the desired distance so that air discharged from a plurality of openings in the top wall of air manifold 74, will flow upwardly along the lower and be guided outwardly by the upward and outward flaring curvature of side portion 73 in the same manner as hereinabove described in connection with the previous forms of construction.

Casing member 70 is constructed with end walls 72 secured to opposite ends of top wall 71, vertical side portion 72 and side portion 73 so that the interior of casing member 70 is sealed in fluidtight relation to form a construction so the casing member will float on the surface of the water with top wall 71 supported slightly above the water surface in the same manner as illustrated in connection with the construction disclosed in FIGS. 1 and 3. An air hose 75 may be connected to air manifold 74 at any suitable point for supplying air under pressure to the manifold for discharge through the apertures in the top wall of the manifold. It will also be understood that an air hose may be attached to air manifold 57 as shown in FIG. 4 and air manifold 65 as shown in FIG. 5, in a suitable manner to supply air under pressure for discharge through the apertures in the manifolds.

The disclosure in FIGS. 6 and 7 also illustrates how end walls and a top wall may be applied to the structure shown in FIGS. 4 and 5 where it is desired to construct a rectangular unit of the types shown in FIGS. 4 and 5 in which the interior of the unit is sealed in liquid tight relation to provide a self floating construction. With the construction shown in FIGS. 6 and 7 the upward air and water flow will be directed outwardly to one side only of casing member 70 so that the water flows outwardly away from one side to keep the surface ice free and to aerate the water outwardly beyond one side of the casing member.

Rectangular units of the character illustrated in FIGS. 4 to 7 inclusive will usually be constructed for use in marinas in conjunction with the docks where boats are stored and in connection with dock constructions where it is desired to have boats moored during the winter when it would be otherwise impractical due to ice conditions. They will normally run in medium sizes up to possibly 20 to 60 feet or more in length with a width adapted to the width of the dock construction with which they will be used which will vary from 4 to probably 20 feet or more. In installations of this character the air lines may be run under the dock and down through the central portion of the casing members for connection with the air manifold either in the central or at the end portions thereof rather than having them connected with air lines lying at the bottom. The above sizes are mentioned only for the purpose of illustration and are not intended to describe size limits for the apparatus made according to the invention.

Where it is desirable to eliminate ice in small ponds, swimming pools and the like, small size units will be used in which the diameter of the casing member, where a circular construction is used may be of the order of 15 to 20 inches and possible up to 4 or 5 feet. In small units of this type it has been found that it may not be necessary to provide a framework of the character illustrated in FIGS. 1 and 2 and also that the casing members may have the top and lower walls made of plastic material which may even be molded into the desired shape. Fiberglas is a well known material used in the construction of hulls for small boats and is also well adapted for use in constructing a casing member for an apparatus of the type disclosed herein in small sizes of the character illustrated in FIGS. 8 and 9 as well as that illustrated in FIGS. 1 and 2.

Figure 8:
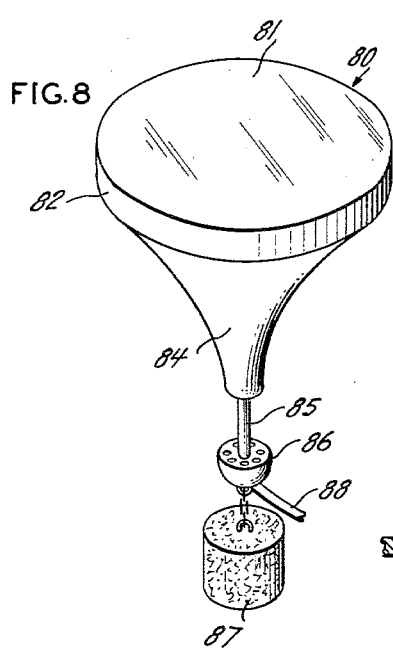
FIG. 8 shows a small size apparatus in perspective, illustrating how the casing member has the top and lower walls formed of molded sheet material and sealed for causing the apparatus to float on the surface of the water with the air manifold mounted below the lower end portion of the lower wall.
Figure 9:
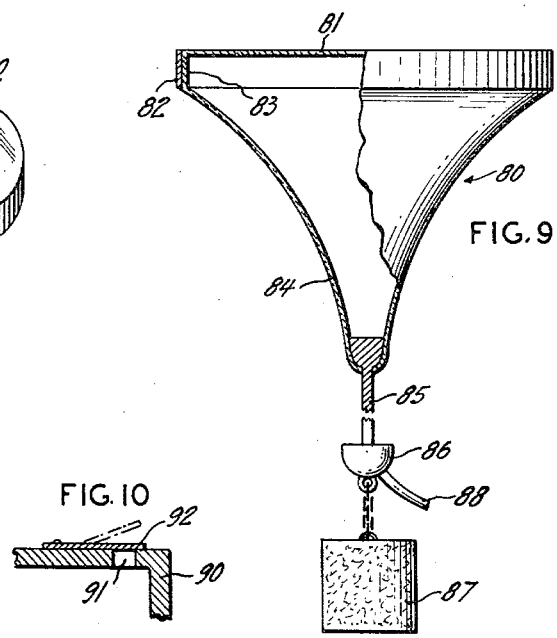
FIG. 9 is a side elevation of the construction shown in FIG. 8 with portions broken away to show details of construction.

The casing member is indicated at 80 in FIGS. 8 and 9. A top wall 81 may be molded in one piece of sheet material having a cylindrical flange 82 for slidable interfitting engagement with a cylindrical flange 83 on lower wall 84. Where these top and lower walls 81 and 84 with their interfitting flanges 82 and 83 are formed from molded plastic or the like, such as Fiberglas, they will be assembled to form a float construction by sealing the joint between flanges 82 and 83 to make the joint fluid-tight. A suitable rod extension 85 is either molded integrally with the lower wall of the same material from which the wall is molded, or the wall is molded around a separate rod to form rod extension 85. At the lower end of rod extension 85 is mounted an air manifold 86 of suitable size and shape preferably having a flat upper wall formed with a plurality of perforations for discharge of air upwardly around rod extension 85 toward the lower end portion of lower wall 84. An anchor cable or chain may be attached to the lower portion of air manifold 86 and a suitable anchor 87 for holding casing member 80 in the desired position in a swimming pool, small pond or the like. Air manifold 86 has a suitable connection for attachment of an air hose 88 which will supply air from a small compressor located on the side of the swimming pool, pond or the like and having a suitable power source for operating the compressor to supply the desired amount of air to air manifold 86 to secure the operation of a small unit according to the size of the swimming pool, pond, or the like.

Figure 10:
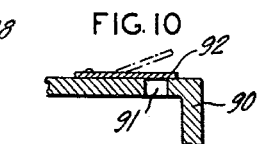
FIG. 10 is an enlarged transverse cross section through a portion of the air manifold and one of the air discharge openings formed therein, illustrating a modification in which a flexible piece of sheet material is used as a closure valve on the outer face of the air manifold to close the air discharge openings when the air pressure is shut off.

FIG. 10 illustrates a substantially enlarged fragmentary cross section of an air manifold 90 which may constitute part of the air manifold illustrated and used in any of the forms illustrated in the several figures as hereinabove described. This enlarged cross section of the air manifold shows one of the air discharge apertures at 91. Where the unit disclosed in the several figures hereinabove described is used in water which is contaminated with dirt and other particles, it has been found desirable to provide a valve means for closing the air discharge apertures in the manifold. FIG. 10 discloses one means of closing air discharge aperture 91 by means of a flexible plastic flap 92. One margin of flap 92 is cemented or otherwise suitably secured to the outer surface of manifold 90 while the portion extending over air discharge aperture 91 is flexible and movable so that when air is discharged under pressure through aperture 91 it will raise flap 92 away from the aperture to a position such as indicated in the dotted lines in FIG. 10. This will provide for discharge of air for the operation of the apparatus in the manner hereinabove described. When it is desired to shut off the air compressor, flap 92 will move to the closed or full line position against the outer surface of air manifold 90 to close aperture 91 and prevent water from running into the interior of the manifold and carrying dirt and other foreign matter with it which may clog the manifold and particularly the air discharge apertures in the manifold thereby rendering the operation of the apparatus less effective. It will be understood that a flap such as that indicated at 92 in FIG. 10 may be made in one or more pieces and may be used to cover more than one aperture depending upon the shape of the manifold. It is for this reason that preference is found in a manifold construction using a flat surface throughout the portion provided with the air discharge perforations.

Figure 11:
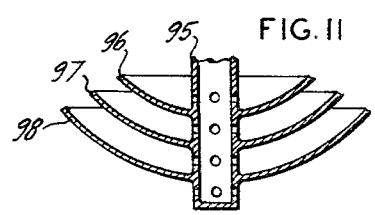
FIG. 11 shows a modified form of air discharge manifold and deflector construction.

FIG. 11 shows a modified form of air manifold construction and deflector from that illustrated in FIGS. 1, 3 and 8. In FIG. 11 an air manifold in the form of a hollow pipe section 95 is formed with a plurality of perforations for discharge of air from manifold 95 outwardly in all directions for use with a circular construction of casing member. To facilitate wider distribution of air bubbles under a casing member such as shown in FIGS. 1 and 3 for example, the construction shown in FIG. 11 has a plurality of distribution plates 96, 97 and 98 secured in spaced relation one below the other between air discharge perforations in manifold 95. Each of the distributor plates 96, 97 and 98 are of successively larger size than the preceding one and may be curved upward slightly so as to provide an annular space between the outer edges of each adjacent pair of plates that is positioned outwardly beyond the opening between the next adjacent pair of plates. Lower distributor plate 98 is spaced above the lower apertures in air manifold 95, as shown in FIG. 11, so that air discharged from the lower end of manifold 95 will be projected outwardly beyond the outer edge of lower distributor plate 98. In this way air bubble discharge from manifold 95 will be distributed under the casing member to obtain contact with a substantially large volume of water for upward circulation and diffusion outwardly by the bottom wall of the casing member with which it is used. It will also be understood that by using a similar construction of manifold on a rectangular unit of the type shown in FIGS. 4 and 5 it would be possible to use a plurality of rows of air discharge holes in the manifold and longitudinally extending distributor plates, similar to distributor plates 96, 97 and 98 for obtaining a similar control of air discharge with a rectangular unit. While the construction with a rectangular unit is not illustrated in detail in the drawing, it is obvious to one skilled in the art from the disclosure in FIG. 11 how to use the features shown in FIG. 11 with the construction shown in FIGS. 4, 5 and 6.

In the use of an apparatus of the character disclosed in this application as above described and as shown in the several figures of the drawing, a substantially large area of a body of water can be maintained in an ice free condition in freezing weather in a highly economical manner and with the use of a small volume of air. The air bubbles guided upward and outwardly by the flaring formation of the lower wall of the casing member provides a more effective circulation of water by use of the power in the air bubbles and also a more efficient aeration of the water for obtaining purification of larger volumes of water than has been heretofore obtained with the use of similar volumes of air.

It will be understood that the vertical baffle plates shown in FIGS. 3 and 5 may be used with the other constructions shown where it is found desirable. The apparatus shown in FIGS. 3 and 5 may also be used without the baffle plates when desired.

Further, the air manifold constructions illustrated may be interchanged among the different forms of construction shown and the air deflecting member and distributor plates illustrated in FIGS. 3 and 11 may be used with any of the several forms of construction illustrated in a manner that should be clear from the description.

The invention claimed is:

1. A device of the class described, comprising a casing member formed of a framework having an outer peripheral member, ribs extending downwardly and inclined toward each other, a lower end member joining the lower ends of said ribs and top frame member joined to said outer peripheral member, a top wall mounted on said top frame members and a lower wall mounted on the outer sides of said ribs, lower end member and peripheral member and cooperating to form a water-tight casing member adapted to float on the surface of a body of water with the top wall projecting above the surface of the water, air discharge means for discharging air bubbles for upward flow about said lower wall for causing upward and outward movement of water about said casing member, means connecting said air discharge means to said casing member, and means for supplying air under pressure to said air discharge means.

2. A device of the character claimed in claim 1 wherein a tubular member extends in upright relation from the top wall to the lower wall of said casing member and opens at said lower wall, said means connecting said air discharge means is a guide member slidably engaged in said tubular member, and an anchor is attached to the lower end of said guide member for anchoring said casing member at a desired location in a body of water.

3. An apparatus for causing circulation in large open bodies of water for elimination of ice and aeration of the water, such as in ponds, lakes and harbors, comprising a casing member for support in the water near the surface, said casing member having a substantially flat top wall, an edge member extending downwardly from the edge of said top wall, a bottom wall having the marginal portion secured to the lower margin of said edge member, having a lower end portion projecting substantially below the horizontal plane of the lower edge of said edge member and spaced therefrom and having the intermediate portion of said bottom wall extending upwardly from said lower end portion at a relatively steep angle and curving progressively outwardly toward a more horizontal plane to the marginal portion thereof attached to said edge member to form a concave bottom wall for gradually changing the direction of upwardly flowing air and water into an outwardly substantially horizontal flow beyond said edge member, an air manifold mounted below the lower end portion of said bottom wall and having a plurality of air discharge apertures formed therein for discharging air upwardly against the outer surface of the lower end portion of said bottom wall, means connecting said air manifold to said casing member, means normally closing said manifold apertures against backflow of water into said manifold, means for supplying air under pressure to said manifold for discharge through said apertures and said last mentioned means, and means for anchoring said casing member in a predetermined location in an open body of water engaging the bottom of said body of water, whereby the air discharged from said manifold will cooperate with said bottom wall and cause upward and outward flow of water from below said casing member along the concave bottom wall to the upper outer edge for discharge outwardly near the surface of the open body of water to circulate said water to melt ice on the surface outwardly a substantial distance beyond said casing member and aerate said water.

4. An apparatus for causing circulation in large open bodies of water for elimination of ice and aeration of the water, comprising a casing member adapted to float near the surface of the water, said casing member having a substantially flat horizontal top wall, an edge wall member extending downwardly from the periphery of the said top wall, a bottom wall having the outer edge attached to the lower edge of said edge wall member and having a lower end portion of rounded form projecting downwardly from said bottom wall of said casing member with the bottom wall portions about said lower end portion extending upwardly and outwardly therefrom in inclined relation, said lower end portion being located at a substantial distance below the plane of the lower edge of said edge wall member, a rod slidably extending through vertically extending relation in said lower end portion and said top wall, an air manifold mounted on the lower end of said rod having apertures in the top wall for discharging air upwardly therefrom under and about said lower end portion, means connected to said manifold for supplying compressed air thereto, valve means mounted on said manifold for preventing water from flowing into said manifold through said apertures, an anchor formed of a heavy body adapted to lie on the bottom of an open body of water, and a flexible member connecting said anchor to the lower end of said rod for holding said casing member in a predetermined location in an open body of water, whereby air bubbles flowing upwardly from said air manifold will cause upward water flow therewith to engage the bottom wall of said casing at the sides of said lower end portion for flow upwardly and outwardly along the inclined portions of said bottom wall for discharge outwardly beyond said edge wall member in substantially horizontal relation to cause the water to flow outwardly along the surface from said casing member, said casing member cooperating to hold said rod in substantially upright position while sliding upwardly and downwardly along said rod with variations in water level.

5. An apparatus as claimed in claim 4, wherein the casing member has a supporting frame comprising a plurality of transversely extending rib members engaging the inner surfaces of said top, bottom and edge walls for supporting said walls, and means connecting said walls to said rib members.

6. An apparatus as claimed in claim 4 wherein said casing member has a supporting frame comprising a central mounting plate engaging said top wall, a lower mounting plate engaged with the upper inner surface of said lower end portion of said bottom wall, a substantially vertically extending guide tube extending between said central mounting plate and said lower mounting plate and having opposite ends attached to said plates, said tube slidably receiving said rod therein, a plurality of rib members secured to said central mounting plate and extending outwardly in engagement with the inner surface of said top wall and along the inner face of said edge wall member; a plurality of rib members attached to said lower mounting plate and extending outwardly in spaced relation along the inner surface of said bottom wall and connected with the ends of said first mentioned rib members at the inner face of said edge wall member, an inner supporting means secured to and extending between said rib members extending along the top and bottom walls in predetermined spaced relation inwardly from said edge wall member, and means securing said top, bottom and edge wall members to said rib members and plates, whereby said plates, rib members and inner supporting means cooperate to support the walls forming said casing member.

References Cited by the Examiner

UNITED STATES PATENTS

| 1,305,944 | 6/19 | Smith | 261—120 |
| 2,074,367 | 3/37 | Cordes | 261—120 |
| 2,365,293 | 12/44 | Robinson | 259—95 |
| 2,415,048 | 1/47 | Sharp | 261—124 |
| 2,417,519 | 3/47 | Persson et al. | 61—6 |
| 2,687,287 | 8/54 | Coppock | 261—124 |
| 2,733,048 | 1/56 | Rowland | 261—123 |
| 2,827,268 | 3/58 | Staaf | 259—95 |
| 3,033,372 | 5/62 | Riddick | 210—242 |

FOREIGN PATENTS

| 494,294 | 3/30 | Germany. |
| 145,696 | 6/31 | Switzerland. |

HARRY B. THORNTON, *Primary Examiner.*

HERBERT L. MARTIN, *Examiner.*